(12) United States Patent
Adams

(10) Patent No.: US 6,707,388 B2
(45) Date of Patent: Mar. 16, 2004

(54) CIRCUIT FOR THE CONTROLLED RETURN OF A POINTER DRIVEN BY A STEPPING MOTOR IN THE EVENT OF FAILURE OF THE SUPPLY VOLTAGE

(75) Inventor: Jürgen Adams, Villingen-Schwenningen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/354,787

(22) Filed: Jan. 30, 2003

(65) Prior Publication Data

US 2003/0140842 A1 Jul. 31, 2003

(30) Foreign Application Priority Data

Jan. 30, 2002 (DE) .......................................... 102 03 670

(51) Int. Cl.[7] .............................. G08B 7/00; G09F 9/00
(52) U.S. Cl. ............... 340/691.7; 340/525; 340/815.58; 340/815.78; 340/815.87; 340/815.59; 116/284; 116/286; 116/288; 116/DIG. 36; 116/DIG. 6; 362/26
(58) Field of Search .............................. 340/691.7, 525, 340/815.45, 815.47, 815.58, 815.78, 815.79, 815.8, 815.75, 815.87, 815.59; 116/284, 286, 288, DIG. 36, DIG. 6; 362/23, 26, 27, 29, 30, 31; 324/137, 103 R, 140 R, 110

(56) References Cited

U.S. PATENT DOCUMENTS 3,916,400 A * 10/1975 Lewis .................... 340/815.78
5,696,704 A * 12/1997 Semrau ................... 340/815.4
6,014,075 A * 1/2000 Fujimori et al. ............ 340/461

FOREIGN PATENT DOCUMENTS

DE      3320088 A1    12/1984
GB      2140922 A     12/1984

* cited by examiner

Primary Examiner—Donnie L. Crosland
(74) Attorney, Agent, or Firm—Cohen, Pontani, Lieberman & Pavane

(57) ABSTRACT

A circuit arrangement for the controlled return of a pointer driven by a stepping motor in the event of failure of the supply voltage includes a control circuit for actuating the stepping motor. The supply voltage at least for the control circuit for the stepping motor is buffered with at least one buffer capacitor, the capacitance of the at least one buffer capacitor being such that the buffer capacitor supplies the control circuit for the stepping motor with electrical power at least until the control circuit has moved the pointer driven by the stepping motor to a default position. The default position is a zero position in relation to the scale on the display apparatus or to another indicated value which is noncritical in relation to the scaling on the display apparatus.

10 Claims, 4 Drawing Sheets

CIRCUIT FOR THE CONTROLLED RETURN OF A POINTER DRIVEN BY A STEPPING MOTOR IN THE EVENT OF FAILURE OF THE SUPPLY VOLTAGE

BACKGROUND OF THE INVENTION

1. Field of the Invention

The present invention relates to a circuit for the controlled return of a pointer driven by a stepping motor in the event of failure of the supply voltage, where the circuit arrangement has a control circuit for actuating the stepping motor. The preferred application of the invention relates to an analog display apparatus in a combination instrument in a vehicle, where the display apparatus indicates a measured variable significant to the operational reliability of the vehicle such as, for example, the brake pressure indicator in the combination instrument in a commercial vehicle.

2. Description of the Related Art

An analog display apparatus for a vehicle with a pointer driven by a stepping motor is known, for example, from UK patent application no. GB 2 140 922, in which an electromagnetically driven rotor in the stepping motor drives the axle of the pointer. In this type of display apparatus, the pointer is almost always driven using a step-down drive mechanism. The step-down drive mechanisms used may, for example, include spur-gear drive mechanisms, which are sometimes even of multistage design, worm drive mechanisms, or spindle drive mechanisms. The drive mechanism and the natural restraint of the stepping motor's rotor, which is of permanent-magnet design, prevents a return spring to return the pointer to its zero position or to another indicated value which is noncritical in relation to the scaling on the display apparatus, as can be done in display apparatuses which are driven by a crossed-coil measuring element or a moving-coil measuring element, which themselves have a return spring by virtue of their principle.

Analog display apparatuses having a pointer driven by a stepping motor therefore have no defined home position in the deenergized or unactuated state. This is because the pointer driven by a stepping motor in these display apparatuses is positioned using digitally calculated angular increments, so that the pointer also needs to be returned to its zero position in relation to the scale on the display apparatus by a corresponding control circuit for the stepping motor. This positioning of the pointer is assisted, for example, by a mechanical stop for the pointer which projects normal to the scale on the display apparatus.

If an unplanned or suddenly occurring failure of the supply voltage to the stepping motor's control circuit occurs (such as a failure triggered by overloading of the on-board power supply), the control circuit, which usually comprises a microcontroller, does not have the time needed to return the pointer driven by the stepping motor to its zero position or to another indicated value which is noncritical in relation to the scaling on the display apparatus. That is, the pointer stays in the last position it adopted above the scale on the display apparatus before the failure of the supply voltage. If this display apparatus is used to indicate a measured variable significant to the operational reliability of the vehicle such as, for example, a display apparatus indicating the brake pressure in the combination instrument in a commercial vehicle, the pointer needs to indicate a noncritical value upon failure of the supply voltage. In the cited example, a brake pressure of zero bar thus needs to be indicated.

SUMMARY OF THE INVENTION

The object of the present invention is to provide a circuit for the controlled return of a pointer driven by a stepping motor in the event of failure of the supply voltage.

The object of the present invention is achieved by a circuit for the controlled return of a pointer driven by a stepping motor in response to a failure of the supply voltage. The circuit includes a display apparatus having a scale arranged thereon and a pointer movably connected to the display apparatus for moving relative to the scale for indicating a value on the scale. A stepping motor is operatively connected to the pointer for moving the pointer relative to the scale. A control circuit actuates the stepping motor, the control circuit receiving a supply voltage.

The circuit according to the present invention includes at least one buffer capacitor arranged for buffering at least the supply voltage for the control circuit for the stepping motor. The capacitance of the at least one buffer capacitor is sized to supply the control circuit for the stepping motor with electrical power at least until the control circuit has moved the pointer driven by the stepping motor to a zero position in relation to the scale on the display apparatus or to another indicated value which is noncritical in relation to the scaling on the display apparatus. The dependent claims then relate to further refinements and developments of the solution found.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters indicate similar elements throughout the several views.

DETAILED DESCRIPTION OF THE PRESENTLY PREFERRED EMBODIMENTS

Figure 1:
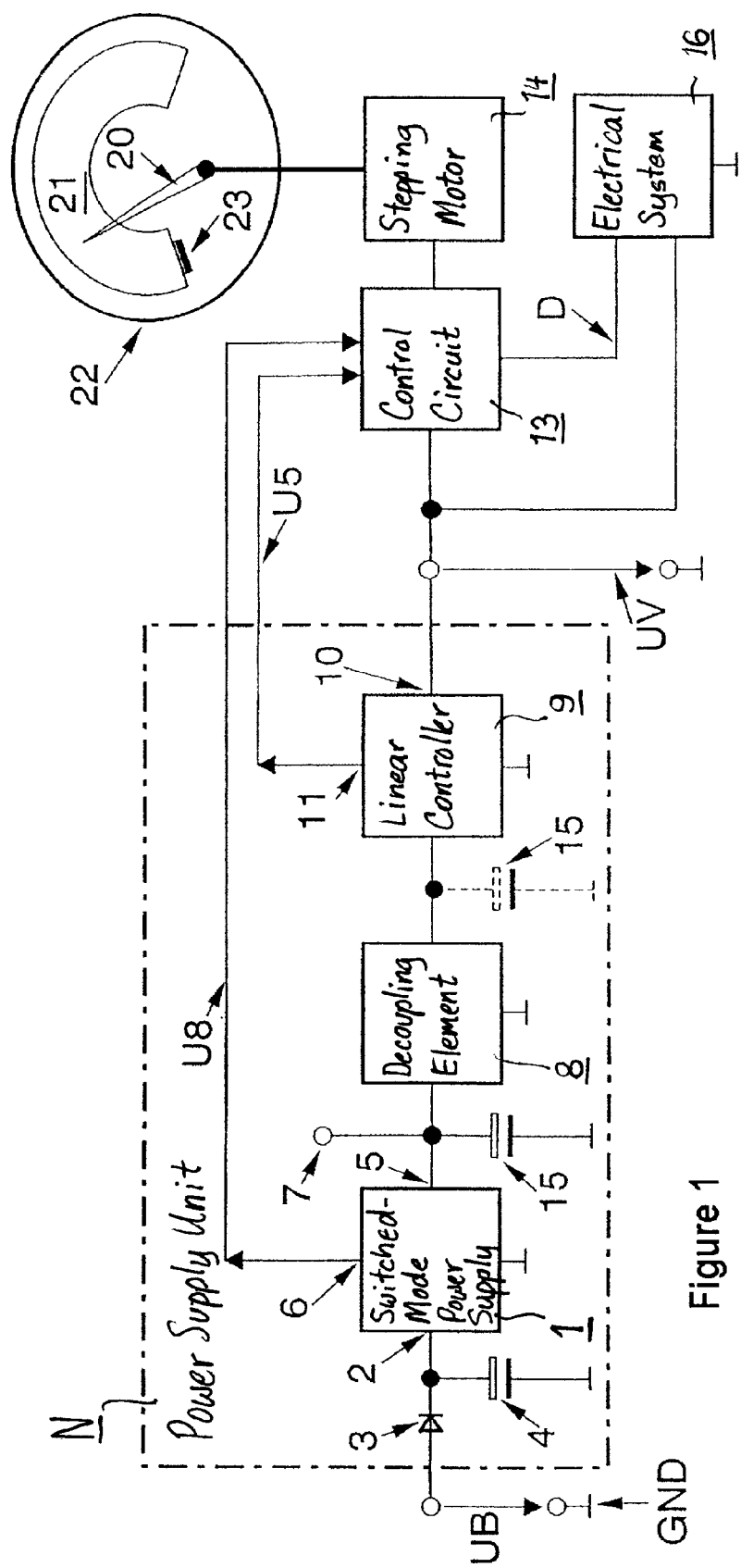
FIG. 1 is a schematic block diagram showing a power supply unit for a combination instrument according to the present invention, in which power buffering acts on the entire electrical system supplied with power by a power supply unit.

FIG. 1 shows a simplified block diagram of a power supply unit N, with a dash-dot border, which may be used for providing electrical power to a combination instrument in a vehicle. The power supply unit N has a switched-mode power supply 1 with an input 2 and an output 5. The input 2 is connected to an operating voltage UB from an electrical on-board power supply of the vehicle via a polarity-reversal protection device 3, i.e., a diode, and via a filter element 4, i.e., a capacitor. The electrical on-board power supply UB is grounded GND. In the example shown in FIG. 1, it will be assumed that the switched-mode power supply 1 stabilizes the operating voltage UB applied at the input 2 to a DC voltage of 8 volts at the output 5. The switched-mode power supply 1 also includes a control output 6 which produces a signal U8 if the voltage produced at the output 5 of the switched-mode power supply 1 falls to below 8 volts as a result of a massive sudden dip in the operating voltage UB. The switched-mode power supply 1 accordingly detects the abrupt drop below a particular voltage threshold.

Some electronic components in the combination instrument, such as LEDs of the GaN type, may require a direct supply of the output voltage of 8 volts because they cannot be operated at a lower voltage on account of their high threshold voltage. To supply electricity to such components, the switched-mode power supply 1 has a tap 7 arranged downstream of the output 5. However, many circuits require a more precise supply voltage UV, regulated to 5 volts, with lower residual ripple than is available at the output 5 of the switched-mode power supply 1. To produce the precise supply voltage UV, a decoupling element 8 is connected to the output 5 of the switched-mode power supply 1 which is further connected to a linear controller 9 having an output 10 for supplying voltage UV for various circuits provided in the combination instrument. A stepping motor 14 contained in a combination instrument and its control circuit 13 are connected to the output 10. The linear controller 9 may also have a control output 11 which produces a signal U5 if the DC voltage produced at the output 10 drops below 5 volts.

The stepping motor 14 is connected to a display apparatus 22 for moving a pointer 20 relative to a scale 21 to indicate a value of a vehicular parameter. According to the present invention, the supply voltage UV at least for the control circuit 13 for the stepping motor 14 is buffered with at least one buffer capacitor 15, the capacitance of the at least one buffer capacitor 15 being sized such that the buffer capacitor supplies the control circuit 13 for the stepping motor 14 with electrical power at least until the control circuit 13 has moved the pointer 20 driven by the stepping motor 14 to a zero position 23 in relation to the scale 21 on the display apparatus 22 or to another indicated value which is noncritical in relation to the scaling on the display apparatus 22. This buffer capacitor 15 may, for example, be arranged at the output 5 of the switched-mode power supply 1 or at the input to the linear controller 9, as indicated by a dashed buffer capacitor 15 in FIG. 1.

This buffer mode for the control circuit 13 for the stepping motor 14 starts as soon as either a fault in the vehicle's electrical on-board power supply causes the operating voltage UB, or a fault in the power supply unit N causes the supply voltage UV for the control circuit 13 for the stepping motor 14, to fall below a particular threshold voltage required for reliable operation of the stepping motor 14 arranged in the combination instrument and its control circuit 13. The drop below the required supply voltage UV is identified by the switched-mode power supply 1, by the linear controller 9 or by both circuits. The signal U8 or U5 produced at the respective control outputs 6 and 11 is supplied to the control circuit 13 for the stepping motor 14. This signal U5, U8 gives the control circuit 13 the instruction to move the pointer 20 driven by the stepping motor 14 to a default position such as the zero position 23 in relation to the scale 21 on the display apparatus 22 or to another indicated value which is noncritical in relation to the scaling on the display apparatus 22.

Figure 2:
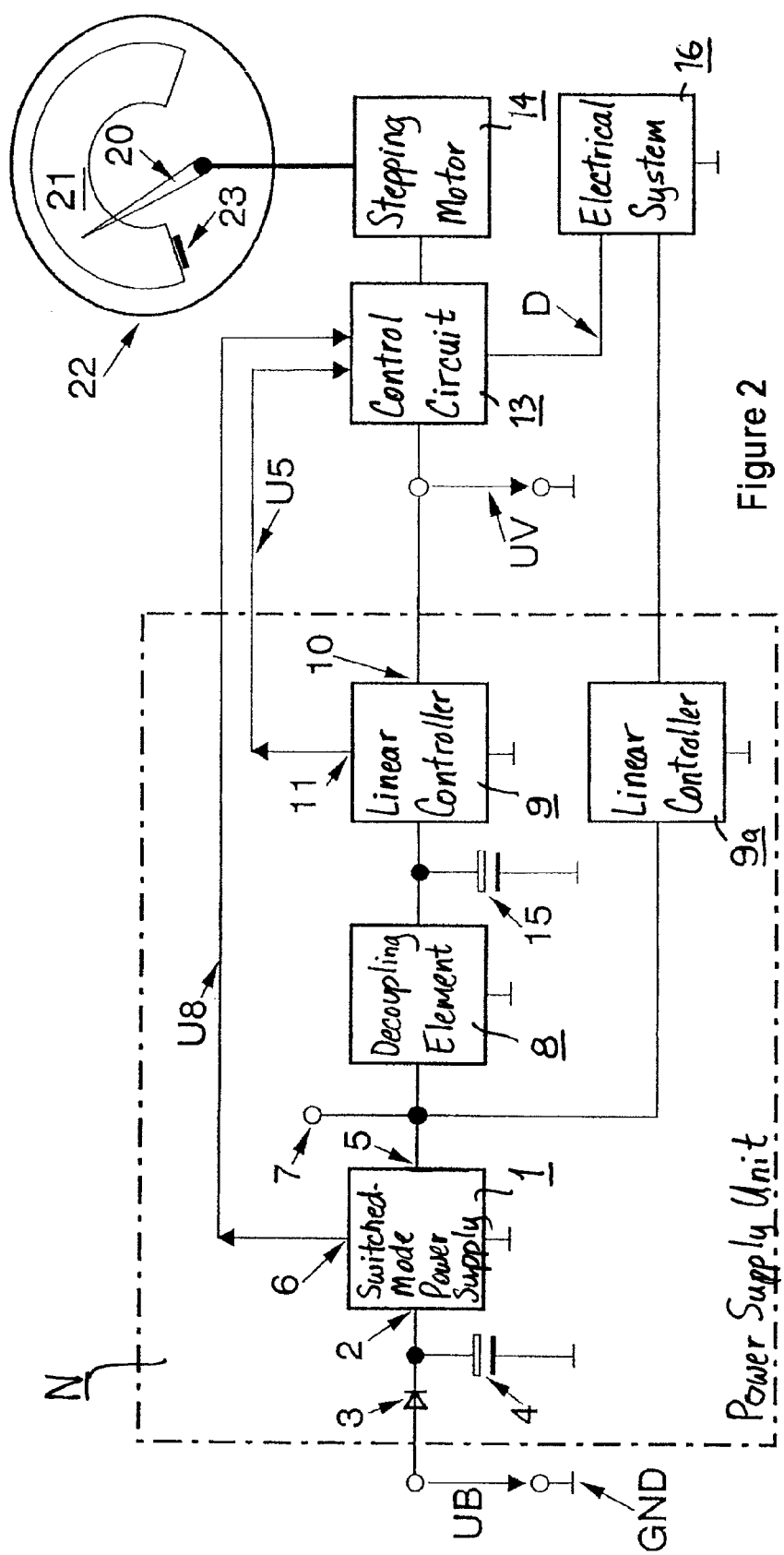
FIG. 2 is a schematic block diagram showing a power supply unit for a combination instrument according to the present invention, in which power buffering acts only on the stepping motor and on its control circuit.

The power buffering may act on the entire electrical system 16 connected to the linear controller 9 or it may act only on the stepping motor 14 and its control circuit 13. The former design case corresponds to the embodiment shown in FIG. 1. This embodiment may be used if the electrical system 16 connected to the linear controller 9 is relatively small, i.e., if the operating current of the electrical system 16 is relatively small compared to the operating current for the stepping motor 14 and its control circuit 13. In the second embodiment, the power buffering is intended to act only on the stepping motor 14 and its control circuit 13 as shown in FIG. 2. This embodiment may be used when the rest of the electrical system 16 provided in the combination instrument requires a high operating current which is unfavorable in relation to the operating current for the stepping motor 14 and its control circuit 13. In the latter design, the power buffering is actually available during emergency operation without restriction for the purpose of returning the pointer 20 driven by the stepping motor 14 to the default position such as the zero position or other position indicating a noncritical value. As shown in FIG. 2, a circuit path is arranged at the output 5 of the switched-mode power supply 1 in the power supply unit N and will be used to supply power to the rest of the electrical system 16 via a linear controller 9a in parallel with the power supply path for the stepping motor 14 and its control circuit 13. In both embodiments shown in FIGS. 1 and 2, a data line D may be connected between the control circuit 13 for the stepping motor 14 and the electrical system 16 supplied with power from the power supply unit N, thereby allowing suitable measures to be taken to influence the rest of the electrical system 16 as well in emergency operation when the signal U8 or U5 is applied to the control circuit 13 for the stepping motor 14. The data line D may comprise a bidirectional design such as, for example, to report faults in the electrical system 16 to the control circuit 13 for the stepping motor 14.

Figure 3:
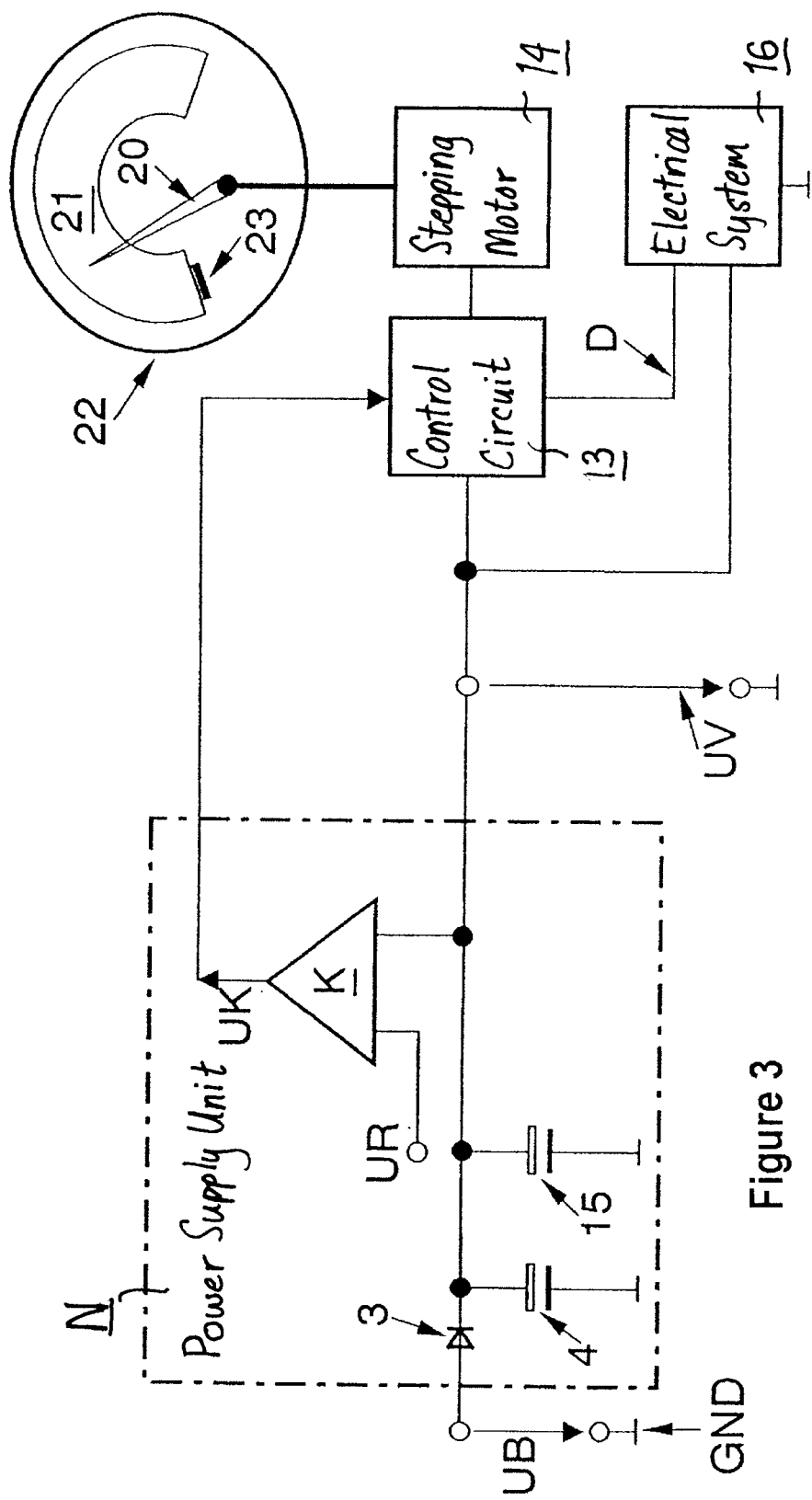
FIG. 3 is a schematic block diagram showing a simplified power supply unit for a combination instrument according to the present invention.

The power supply unit N for a combination instrument may not always equipped with a switched-mode power supply 1 or a linear controller 9. FIG. 3 shows at least one buffer capacitor 15 provided in the actual electrical input circuitry for the combination instrument, that is to say on the connection for the operating voltage UB. The buffer capacitor 15 in this embodiment must be designed for the maximum operating voltage UB arising at the input in that arrangement. To give the control circuit 13 for the stepping motor 14 the instruction to return the pointer, a comparator K for comparing the applied operating voltage UB with a preset reference value UR may be provided at that point in the electrical input circuitry. An output signal UK from the comparator K is supplied to the control circuit 13 for the stepping motor 14 similar to the connection of signals U5 and U8 in the previous embodiment of FIGS. 1 and 2. With the exception of the control circuit 13 for the stepping motor 14, all the other electrical loads in the electrical system 16 for the combination instrument, such as pilot lights and illuminations on display apparatuses, are turned off when the signals U5, U8 or UK are triggered to indicate abrupt electrical undersupply. Accordingly, all of the power drawn from the at least one buffer capacitor 15 is available for returning the pointer 20 driven by the stepping motor 14 to the default position such as its zero position 23 or to another value which is noncritical in relation to the scaling on the display apparatus 22.

The actual return of the pointer 20 driven by the stepping motor 14 to the default position in relation to the scaling on the display apparatus 22 may be implemented in different ways. In one implementation, the polarities of the electrical pole magnets for the rotor of the stepping motor 14 may be alternated rapidly. This causes the pointer 20 connected to the rotor to run straight to, for example, a mechanical stop which projects from the scale 21 on the display apparatus 22 and marks the zero position 23 or another indicated value which is noncritical in relation to the scaling on the display apparatus.

Figure 4:
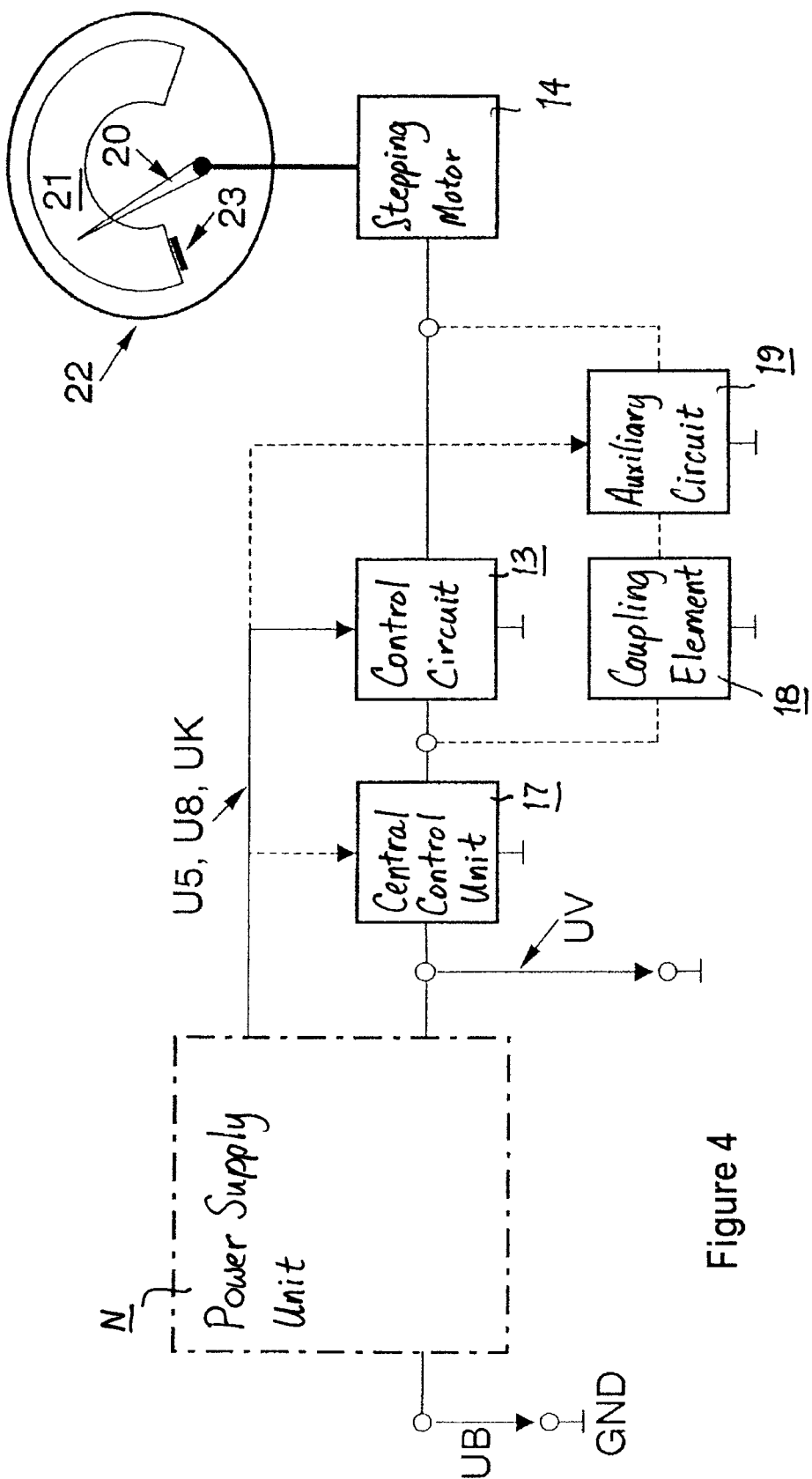
FIG. 4 is a schematic block diagram showing a design option according to the present invention for implementing the controlled return of a pointer driven by a stepping motor in the event of failure of the supply voltage.

However, other implementations are also possible. For example, a central control unit 17 in the form of a microprocessor may be provided in the electronic circuit arrangement for the combination instrument to perform superordinate control tasks, as shown in FIG. 4. In a similar manner to that shown in FIGS. 1 to 3, the central control unit 17 may be supplied with power by a power supply unit N comprising a switched-mode power supply 1 with or without a linear controller 9 or 9a or comprising even simpler electrical input circuitry for the combination instrument. The central control unit 17 is connected to the control circuit 13, comprising a microcontroller, for the stepping motor 14. If a plurality of displays on the combination instrument are driven by a stepping motor, then only that stepping motor 14 may have an independent control circuit 13 (albeit connected to the central control unit 17) when this stepping motor 14 is used to move the pointer 20 on a display apparatus 22 indicating a measured variable significant to the operational reliability of the vehicle, such as the brake pressure in a commercial vehicle. If a signal U5, U8 or UK indicating electrical undersupply is now reported to the central control unit 17 or to the independent control circuit 13 for the stepping motor 14, the control circuit 13 for the stepping motor 14, which control circuit is indirectly or directly buffered with at least one buffer capacitor 15 in accordance with the invention, is temporarily decoupled from the central control unit 17 and moves the pointer 20 driven by the stepping motor 14 to its zero position 23 or to another indicated value which is noncritical in relation to the scaling on the display apparatus in a controlled fashion.

As FIG. 4 indicates in a dashed path arranged in parallel with the control circuit 13 for the stepping motor 14, the pointer 20 provided in the same manner as in FIGS. 1 to 3 may also be returned using a simple auxiliary circuit 19 which comprises, by way of example, a shift register or a one-of-n-coded counter with suitable feedback and an oscillator circuit and, in fault-free operation, is decoupled from the central control unit 17 or from the independent control circuit 13 for the stepping motor 14 by coupling elements 18. This auxiliary circuit 19 is only intended to act on the stepping motor 14 when a signal U5, U8 or UK is triggered to indicate abrupt electrical undersupply and applied to the central control unit 17, the independent control circuit 13 for the stepping motor 14, or the auxiliary circuit 19.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A circuit for controlled return of a pointer of a display apparatus to a default position, said circuit comprising:
   a display apparatus having a scale arranged thereon and a pointer movably connected to said display apparatus for moving relative to said scale for indicating a value on said scale;
   a stepping motor operatively connected to said pointer for moving said pointer relative to said scale;
   a control circuit for actuating said stepping motor, said control circuit comprising an input for receiving a supply voltage; and
   at least one buffer capacitor having a capacitance and connected for buffering the supply voltage,
      said control circuit moving said pointer to a default position relative to the scale in response to a failure of the supply voltage, said capacitance being sized such that said at least one buffer capacitor supplies electrical power to said control circuit during the failure of the supply voltage at least until said control circuit moves said pointer to said default position, wherein said default position of said pointer comprises one of a zero position on said scale and another position indicating a noncritical value.

2. The circuit of claim 1, further comprising a power supply providing said supply voltage to said control circuit, said power supply comprising one of a linear controller and a comparator for comparing an operating voltage of said circuit to a reference voltage and outputting a signal indicating an electrical undersupply in response to said operating voltage being below a threshold voltage.

3. The circuit of claim 2, wherein said power supply comprises a switched-mode power supply having an output voltage, said operating voltage comprising the output voltage of said switched-mode power supply.

4. The circuit of claim 2, wherein said at least one buffer capacitor is arranged in said power supply.

5. The circuit of claim 1, further comprising a central control unit operatively connected to said control circuit for controlling said circuit, said stepping motor being selectively actuatable by said central control unit and by said control circuit.

6. The circuit of claim 5, further comprising an auxiliary circuit and a coupling element for selectively connecting said auxiliary circuit to said central control unit, said auxiliary circuit operable for actuating said stepping motor for returning said pointer to said default position in response to failure of the supply voltage.

7. The circuit of claim 5, wherein said auxiliary circuit comprises one of a shift register and a one-of-n-coded counter with suitable feedback and an oscillator circuit.

8. The circuit of claim 1, wherein said display apparatus comprises an analog display apparatus in a combination instrument for a vehicle.

9. The circuit of claim 7, wherein said display apparatus indicates a measured variable significant to the operational reliability of the vehicle.

10. The circuit of claim 9, wherein said display apparatus indicates brake pressure in a commercial vehicle.

* * * * *